United States Patent
Saari et al.

(10) Patent No.: US 8,281,695 B2
(45) Date of Patent: Oct. 9, 2012

(54) CHIP VACUUM SYSTEM

(75) Inventors: Dean T. Saari, Hortonville, WI (US);
Ronald W. Schwilk, Oshkosh, WI (US)

(73) Assignee: Marvel Manufacturing Company, Inc., Oshkosh, WI (US)

( * ) Notice: Subject to any disclaimer, the term of this patent is extended or adjusted under 35 U.S.C. 154(b) by 426 days.

(21) Appl. No.: 12/440,114

(22) PCT Filed: Sep. 5, 2006

(86) PCT No.: PCT/US2006/034677
§ 371 (c)(1),
(2), (4) Date: Mar. 5, 2009

(87) PCT Pub. No.: WO2008/030233
PCT Pub. Date: Mar. 13, 2008

(65) Prior Publication Data
US 2010/0186565 A1    Jul. 29, 2010

(51) Int. Cl.
*B26D 7/06* (2006.01)
*B26D 7/08* (2006.01)
*B24B 55/06* (2006.01)
(52) U.S. Cl. ............. 83/100; 451/456; 83/98; 83/168
(58) Field of Classification Search ............ 83/98, 100, 83/168, 102.1, 584; 15/304, 250.02, 252.1; 451/451, 456; 144/252.1
See application file for complete search history.

(56) References Cited

U.S. PATENT DOCUMENTS

| | | | | |
|---|---|---|---|---|
| 3,322,169 A | * | 5/1967 | Hilliard | 83/100 |
| 3,514,906 A | * | 6/1970 | Everett | 451/236 |
| 3,555,658 A | * | 1/1971 | Hans-Gerald | 409/131 |
| 3,844,189 A | * | 10/1974 | Jardine | 83/98 |
| 3,880,047 A | * | 4/1975 | Dosier | 409/134 |
| 4,370,140 A | * | 1/1983 | Fegley et al. | 493/289 |
| 4,591,122 A | * | 5/1986 | Kreuzer | 248/281.11 |
| 4,612,842 A | * | 9/1986 | Miller | 83/24 |
| 4,633,743 A | * | 1/1987 | Ichikawa | 83/100 |
| 4,672,902 A | * | 6/1987 | Michaels | 112/287 |
| 4,705,438 A | * | 11/1987 | Zimmerman et al. | 409/132 |
| 4,822,219 A | * | 4/1989 | Wood et al. | 409/137 |
| 4,875,398 A | * | 10/1989 | Taylor et al. | 83/100 |
| 5,336,130 A | * | 8/1994 | Ray | 454/65 |
| 5,491,320 A | * | 2/1996 | Taylor | 219/137.41 |
| 5,544,986 A | * | 8/1996 | Kudo et al. | 408/67 |
| 5,582,225 A | * | 12/1996 | Schank | 144/286.1 |
| 5,606,767 A | * | 3/1997 | Crlenjak et al. | 15/301 |
| 5,615,984 A | * | 4/1997 | Oberbreckling | 409/137 |

(Continued)

FOREIGN PATENT DOCUMENTS

DE    19720582 C1 *    2/1999
(Continued)

*Primary Examiner* — Stephen Choi
*Assistant Examiner* — Samuel A Davies
(74) *Attorney, Agent, or Firm* — Joseph S. Heino; Patrick M. Bergin (57) ABSTRACT

A vacuum system and apparatus extracts metal chips and cuttings away from the cutting area of a sawing machine. The system and apparatus is located on the previously cut surface end of the saw and includes rotatable bracketry to engage and disengage a vacuum nozzle from the end of a cut piece to extract metal chips and cuttings from the inside of hollow metal stock as the stock is being cut. Rotation of the bracketry is actuated by means of an electronic controller or other control circuitry.

7 Claims, 7 Drawing Sheets

U.S. PATENT DOCUMENTS

| | | | | |
|---|---|---|---|---|
| 5,642,766 | A * | 7/1997 | MacCauley, III | 144/329 |
| 5,836,225 | A * | 11/1998 | Molnar et al. | 83/100 |
| 5,879,515 | A * | 3/1999 | Straub et al. | 162/275 |
| 5,951,219 | A * | 9/1999 | Stadtfeld et al. | 409/131 |
| 6,021,772 | A * | 2/2000 | Seifert et al. | 125/13.02 |
| 6,036,412 | A * | 3/2000 | Dalla | 409/136 |
| 6,061,865 | A * | 5/2000 | Susnjara et al. | 15/301 |
| 6,206,621 | B1 * | 3/2001 | Sebring | 409/137 |
| 6,244,145 | B1 * | 6/2001 | Hada et al. | 83/13 |
| 6,318,351 | B1 * | 11/2001 | Baratta | 125/12 |
| 6,405,623 | B2 * | 6/2002 | Lavallee | 83/13 |
| 6,470,778 | B1 * | 10/2002 | Kaye et al. | 83/100 |
| 6,470,930 | B1 * | 10/2002 | Stottmann | 144/252.1 |
| 6,503,139 | B2 * | 1/2003 | Coral | 454/65 |
| 6,615,698 | B2 * | 9/2003 | Chuang et al. | 83/24 |
| 6,851,900 | B2 * | 2/2005 | Tillemans et al. | 409/130 |
| 6,854,366 | B2 * | 2/2005 | Nitagai et al. | 82/52 |
| 6,966,132 | B1 * | 11/2005 | Jacobsen et al. | 37/195 |
| 7,214,011 | B2 * | 5/2007 | Ryai et al. | 409/81 |
| 2001/0032401 | A1 * | 10/2001 | Lewis et al. | 37/196 |
| 2003/0066179 | A1 * | 4/2003 | Shiba et al. | 29/426.3 |
| 2003/0121182 | A1 * | 7/2003 | Jacobsen et al. | 37/195 |
| 2003/0209120 | A1 * | 11/2003 | Liao et al. | 83/78 |
| 2004/0060405 | A1 * | 4/2004 | Kao | 83/100 |
| 2005/0098006 | A1 * | 5/2005 | Jorgensen | 83/100 |
| 2005/0178470 | A1 * | 8/2005 | Wang | 144/252.1 |
| 2005/0268940 | A1 * | 12/2005 | Vohra | 134/6 |
| 2006/0042439 | A1 * | 3/2006 | Powell | 83/100 |
| 2006/0291970 | A1 * | 12/2006 | Granger | 409/137 |
| 2010/0178850 | A1 * | 7/2010 | Sondag | 451/44 |
| 2010/0197211 | A1 * | 8/2010 | Guth | 451/456 |

FOREIGN PATENT DOCUMENTS

FR        2772655 A1 *  6/1999

* cited by examiner

CHIP VACUUM SYSTEM

FIELD OF THE INVENTION

This invention relates generally to sawing machines and to apparatus and assemblies that are used with such sawing machines. More specifically, this invention relates to a system and apparatus that is an attachment to a sawing machine, the sawing machine being used for cutting hollow metal stock. It also specifically relates to a system and apparatus that removes metal chips from the cutting area of the sawing machine by means of a movable, vacuum extraction assembly that places a vacuum nozzle in engagement with an end of the stock that is close to the cutting area during cutting.

BACKGROUND OF THE INVENTION

In the art of using sawing machines for cutting hollow metal stock, one problem that is frequently encountered is that metal chips and cuttings tend to accumulate in the cutting area, and particularly within the hollow of the metal stock, thus requiring the saw to cut through the chips and cuttings more than once. As successive cuts are made through the stock, and particularly where a blower system is used, the metal chips and cuttings tend to move away from the cutting area and accumulate within the hollow such that the hollow becomes more and more filled with metal chips and cuttings.

In the area of chip removal systems that use air pressure to blow the metal chips and cuttings away from the cutting area, doing so tends to cause problems elsewhere within the sawing machine. That is, while metal chips and cuttings are successfully removed from the cutting area by the blower system, the same metal chips and cuttings are moved to other areas of the sawing machine where they can cause problems and potential damage elsewhere in the machine.

Accordingly, it is an object of the present invention to provide a means for extracting metal chips and cuttings away from the cutting area of a sawing machine without simply moving them to other undesirable areas of the machine. It is another object to provide a system and apparatus that accomplishes this extraction by means of a vacuum arrangement. It is still another object of the present invention to provide such a system and apparatus that utilizes a minimal number of elements and a minimal number of steps to use. It is yet another object to provide such a system and apparatus that can be used as original equipment or as a retrofit to sawing machines of current manufacture and design, such machines being used to cut hollow metal stock.

In the disclosure that follows, it is to be understood that the terms "hollow metal stock" or "stock" shall be interpreted to mean metal tubing, metal extrusions, or any other structures that have one or more cavities defined in them and which may be cut into smaller parts by use of a sawing machine, the sawing machine being adapted to cut through the cavity or cavities of the stock. It is also to be understood that the cross-sectional profile of the hollow metal stock can be in any shape including, by way of example, circular, oblate, square or rectangular, the shape of the stock not being a limitation of the present invention. It is further to be understood that the cross-sectional dimension or size of the hollow metal stock is not a limitation of the present invention either.

SUMMARY OF THE INVENTION

The chip vacuum system and apparatus of the present invention has obtained these objects. It utilizes an industrial vacuum assembly to extract metal chips and cuttings away from the cutting area of a sawing machine. The vacuum can be utilized on the part end of the machine, and is disclosed in the preferred embodiment as such. The system and apparatus of the present invention utilizes bracketry that rotates a vacuum nozzle into place to allow for metal chip and cutting removal from inside the hollow metal stock as the stock is cut by the blade of the sawing machine. For each part that is cut, the vacuum nozzle rotates into position during the cut, thus allowing the nozzle to extract metal chips and cuttings from within the hollow stock as the cut is made and as the metal chips and cuttings are being produced as a by-product of the saw blade cutting through the stock. Between cuts, the vacuum nozzle rotates out of the way to allow the cut part to be moved out of the cutting area. As a new cut is ready to be made, the nozzle is rotated back into its extraction position.

The system and apparatus of the present invention allows the bracketry to be adjusted to accommodate hollow stock of, different cross-sectional dimensions, diameters, or sizes, as alluded to above, and allows the saw to cut parts of different lengths from the stock. The vacuum nozzle mates with the first part to extract metal cuttings and chips from within the part as the cut is being made. Means are included within the bracketry for linear movement of the nozzle relative to the part which allows the nozzle to be backed away ever so slightly as it is rotated out of the way, thus allowing a small clearance between the part and the nozzle following each cut and prior to the next cut being made as the stock is advanced by normal indexing between part cuts.

The foregoing and other features of the system and apparatus of the present invention will be apparent from the detailed description that follows.

DETAILED DESCRIPTION OF THE PREFERRED EMBODIMENT

Figure 1:
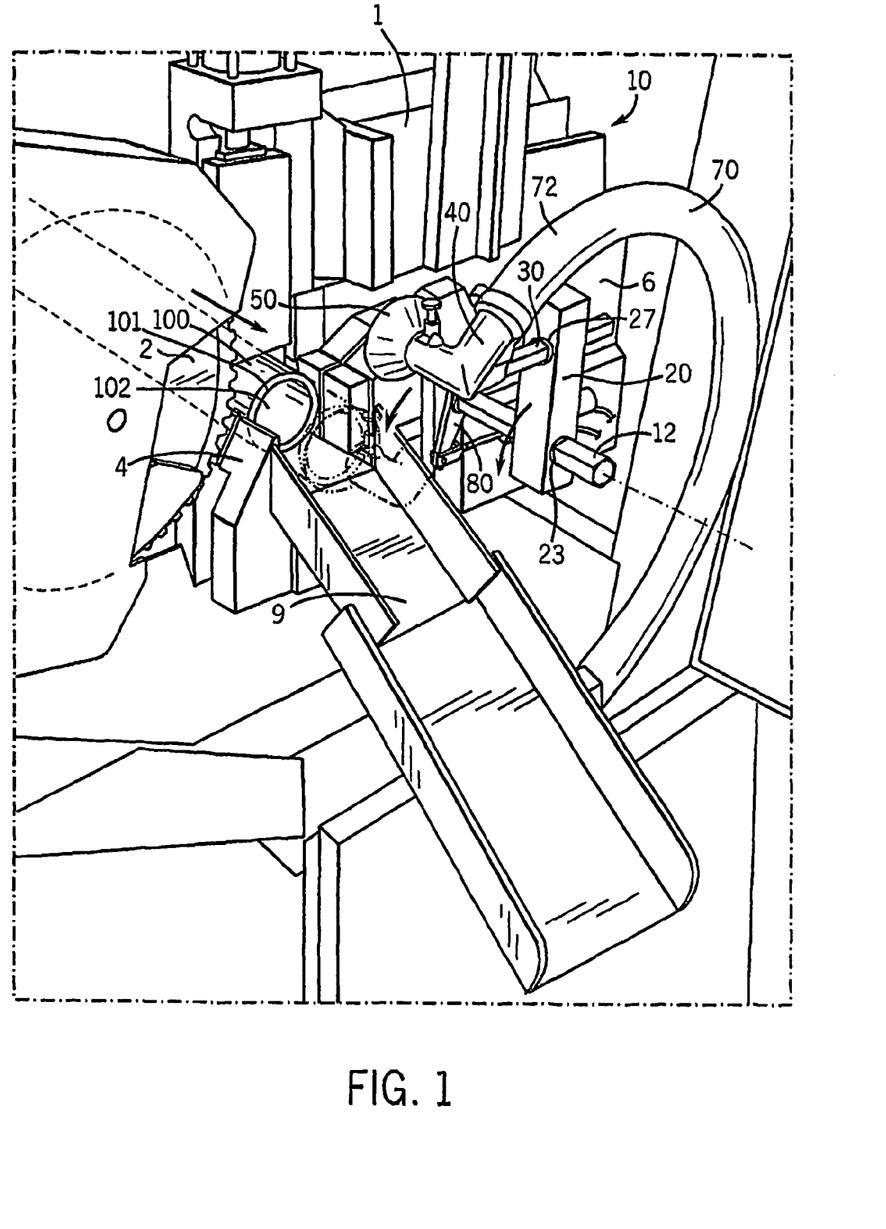
FIG. 1 is a top, left side and front perspective view of the chip vacuum system and apparatus of the present invention shown as it would be attached to a sawing machine.

Referring now to the drawings in detail, wherein like numerals represent like structure and elements throughout, FIG. 1 illustrates the "output" end of a sawing machine which, in this particular embodiment is a circular saw sawing machine, generally identified 1, of the type with which the assembly and apparatus of the present invention is intended to be used. It is to be understood, however, that other sawings machines could also be fitted with the apparatus and assembly of the present invention without deviating from the scope of the present invention and from the claims that follow.

As shown in FIG. 1, the circular saw cutting machine 1 includes a blade 2, the blade 2 being disposed in a substantially vertical plane. Again, the relative position of the blade 2 is for purposes of describing enablement of the invention and is in no way limiting the invention. The blade 2 could be positioned at an angle or even in the horizontal, such not being a limitation of the present invention. In the position shown, the blade 2 can cut transversely through a piece of hollow metal stock 100 that would be placed horizontally and in the path of the blade 2. The sawing machine 1 also includes a holder 4 within which the longitudinally-extending piece of stock 100 can be securely clamped. As shown, the stock 100 is a piece of cylindrically-shaped stock having a continuous wall 101 and a hollow interior 102. The sawing machine 1 places the stock 100 along a line that presents the stock 100 in a transverse plane relative to the blade 2. In this position, the blade 2 is able to cut squarely through the stock 100, thereby creating smaller cylindrically-shaped segments or pieces from the longitudinally-extending stock 100. As alluded to previously, the blade 2, in alternative embodiments, could cut the stock 100 at an angle, for example. It is also to be understood that the sawing machine 1 includes an advancement and indexing means (not shown) whereby the stock 100, once clamped within the holder 4, can be incrementally advanced and cut in lengths as are desired or required by the machine operator.

Figure 2:
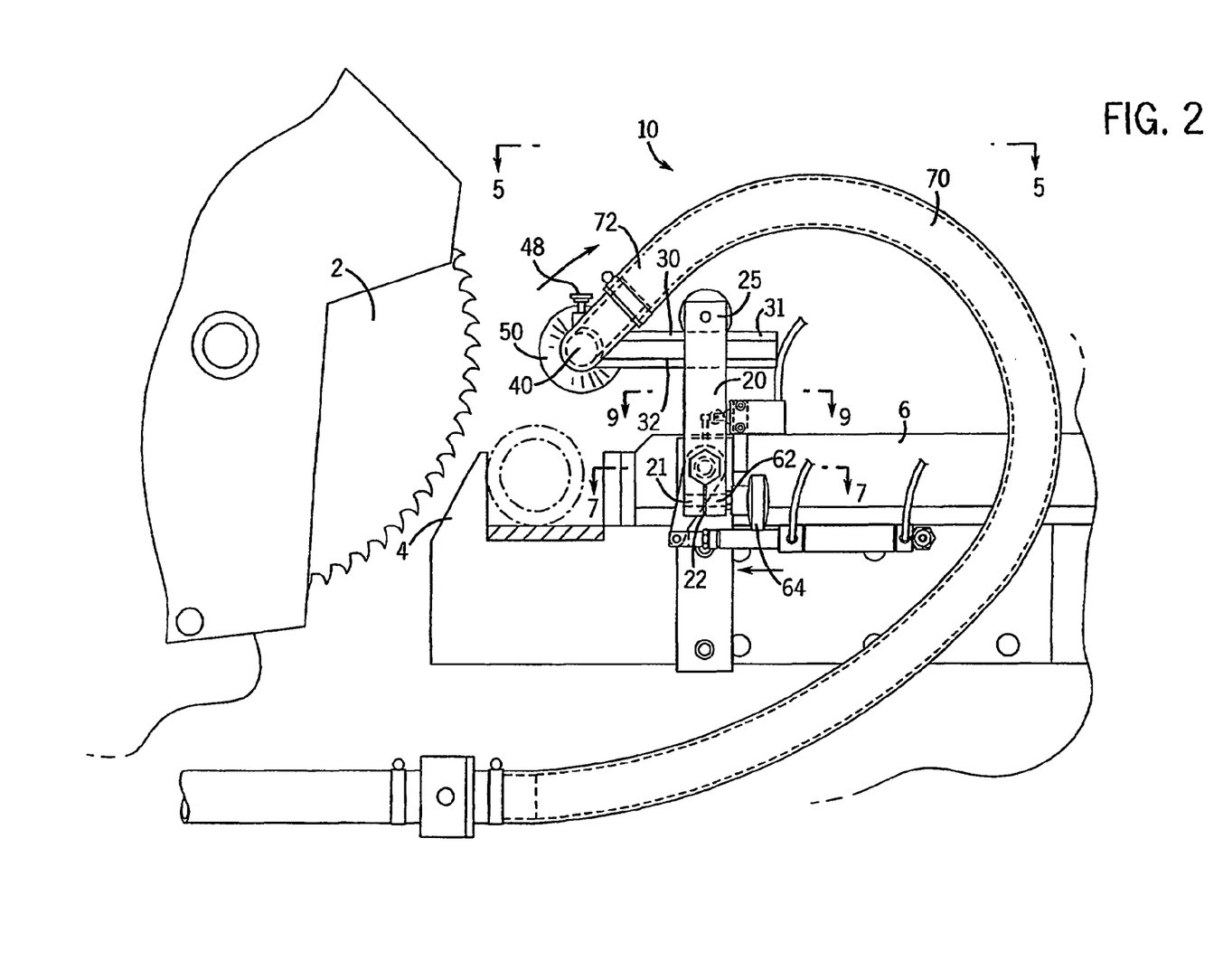
FIG. 2 is a front elevational view of the chip vacuum system and apparatus illustrated in FIG. 1 and showing the nozzle portion of the apparatus in a fully "up" position.

As shown in FIG. 2, the sawing machine 1 also has, at its output side, a substantially vertical side surface 6 to which the chip vacuum assembly and apparatus, generally identified 10, can be mounted. As shown, the side surface 6 of the sawing machine 1 is disposed in a generally vertical plane but such is not a limitation of the present invention. That is, other geometries of the machine side surface 6 could be used with minor adaptation of the apparatus and assembly of the present invention. In very general terms, the assembly and apparatus 10 of the present invention can be said to include four basic components: a vacuum nozzle; bracketry for supporting and moving the nozzle; means for moving the bracketry and nozzle; and a vacuum means.

Figure 5:
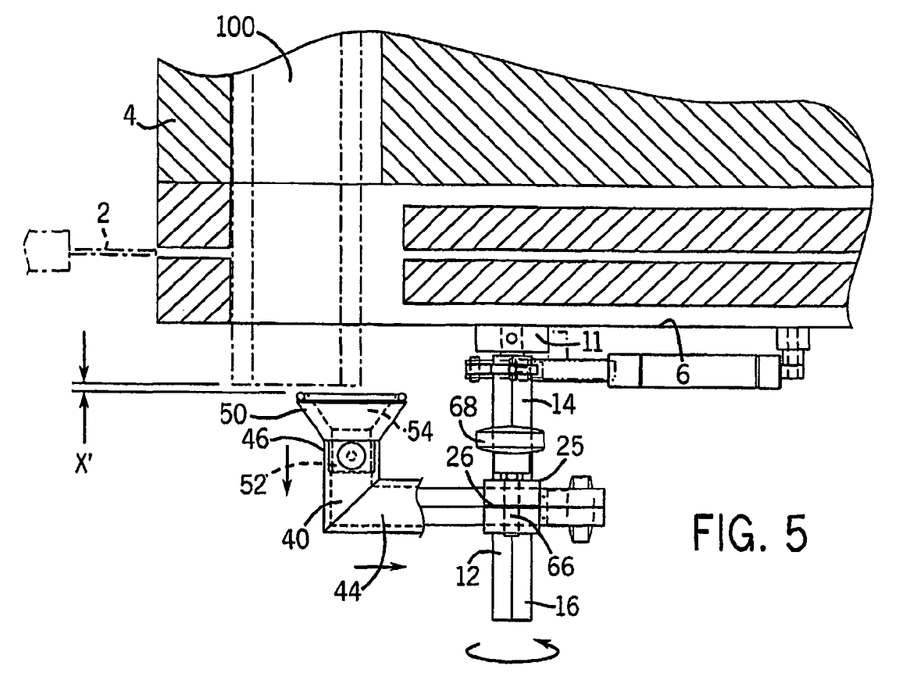
FIG. 5 is a partial top plan view of the system and apparatus of the present invention taken along line 5-5 of FIG. 2.
Figure 6:
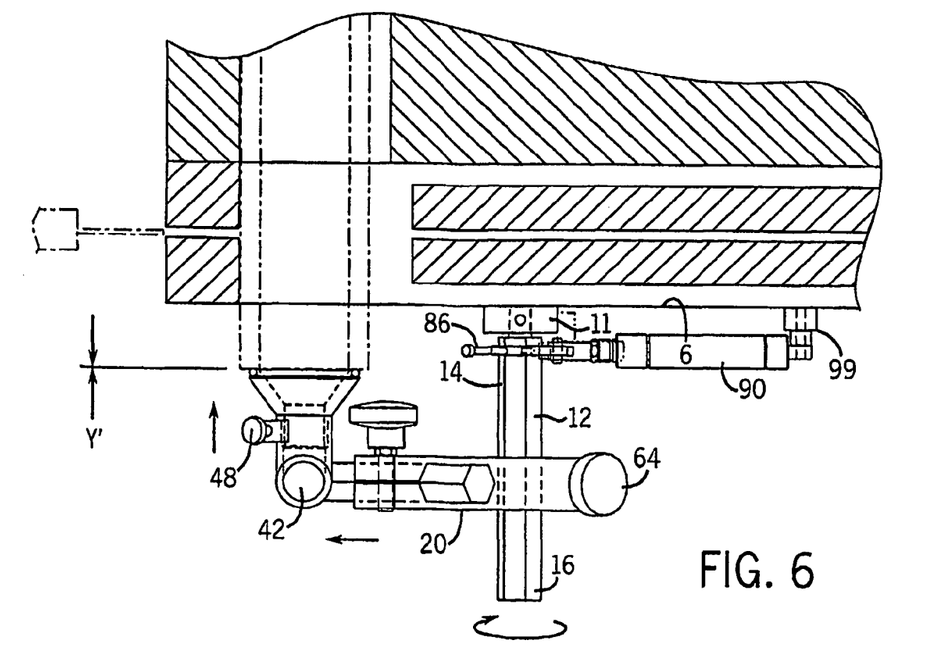
FIG. 6 is a partial top plan view of the system and apparatus of the present invention taken along line 6-6 of FIG. 3.

More specifically, and now referring to FIGS. 5 and 6, it will be seen that the chip vacuum assembly and apparatus 10 includes a pivoting first hex slide 12 having a first end portion 14 that is proximal to the side surface 6 of the sawing machine 1 and a second end portion 16 that is distal from the side surface 6 of the sawing machine 1. The first hex slide 12 is the first element of the "bracketry" mentioned above. While this first slide 12 is defined and illustrated as having a hexagonal or "hex" cross-section, such is not a limitation of the present invention. That is, other cross-sectional shapes for the first slide 12 could be used without deviating from the scope of the present invention. The pivoting first hex slide 12 extends outward and generally perpendicularly from the vertical surface of the side 6 of the sawing machine 1 in this particular embodiment. The first hex slide 12 is rotatably anchored to it by means of a keeper 11, the details of which will be discussed later in this detailed description.

Secured to, and movable along the length of, the pivoting first hex slide 12 is the second element of the bracketry, which is a double split clamp 20. See FIGS. 1 and 2. The double split clamp 20 has a first end 21 and a second end 25. The first end 21 of the double split clamp 20 includes a gap 22 and an aperture 23 defined within the gap 22. See FIG. 1. Similarly, the second end 25 of the double split clamp 20 includes a gap 26 and an aperture 27. See FIG. 5. Note that the gap 22 defined in the first end 21 of the claim 20 is disposed in a first plane. Note also that the gap 26 defined in the second end 25 of the clamp 20 lies in a plane that is rotated 90° from that of the gap 22 of the first end 21. That is, the planes that the gaps 22, 26 lie in are substantially perpendicular to one another. The reason for this configuration will be apparent later in this detailed description.

The aperture 23 of the first end 21 of the double split clamp 20 is configured and functionally adapted to receive a portion of the pivoting first hex slide 12 within it. Once the clamp aperture 23 receives the first hex slide 12, the double split clamp 20 is thereby longitudinally movable and locatable along the pivoting hex slide 12. Additionally, the clamp 20 is securable at a given position along the hex slide 12 by means of a tightening bolt 62 and head 64 fastener arrangement. See FIG. 2.

The chip vacuum assembly and apparatus 10 of the present invention also includes the third element of the bracketry, which is a second hex slide 30. See FIGS. 1 and 2. The second hex slide 30 has a proximal portion 31 and a distal portion 32. That is, the proximal portion 31 is "proximal" to the clamp 20 and the distal portion 32 is "distal" or away from the clamp 20. The proximal portion 31 of the second hex slide 30 is receivable within the aperture 27 of the second end 25 of the double split clamp 20, and the aperture 27 is so configured. The second hex slide 30 is securable at a given position relative to the split clamp 20 by means of a tightening screw 66 and head 68 fastener arrangement. See FIG. 5. At the distal end 32 of the second hex slide 30, a suction head 40 is attached, preferably by weldment.

The suction head 40 of the assembly 10 includes a first end 44, a second end 46 and a centrally-disposed aperture 42. As shown, the suction head 40 is a generally right-angled, L-shaped structure, but such is not a limitation of the present invention. That is, the suction head 40 could be altered in its physical shape without deviating from the scope of this invention or the claims that follow. What is significant is that the aperture portion 42 at the second end 46 of the suction head 40 include means for removably receiving a nozzle 50, the nozzle 50 being a generally conical structure having a first end 52 and a flared second end 54. Here again, the conical shape of the flared second end 54 of the nozzle 50 is not a limitation of the present invention. To be effective in the application, however, the second end 54 of the nozzle 50 should match the cross-sectional configuration presented by the cut surface 103 of the stock 100. See, for example, FIG. 11. In this fashion, maximum vacuum suction will be applied to the part by the nozzle 50. To configure the nozzle 50 otherwise would result in gaps being created between the nozzle 50 and the cut surface 103, thus reducing the effectiveness of the vacuum as it is applied. Referring back to this preferred embodiment, it will be seen that the first end 52 of the nozzle 50 is secured within the second end 46 of the suction head 40 by means of a set screw 48, or other suitable fastener. See FIG. 6.

In the preferred embodiment, a resilient O-ring 56 is attachable to the flared second end 54 of the nozzle 50. Again, see FIG. 11. The purpose of the O-ring 56 is to further insure a good seal between the second end 54 of the nozzle 50 and the cut surface 103 of the part, the O-ring 56 being capable of resilient compression and deformation at the cut surface 103. With the first end 52 of the nozzle 50 attached to the second end 46 of the suction head 40, an air flow continuum is created through the nozzle 50 and the suction head aperture 42. The first end 44 of the suction head 40, in turn, has one end 72 of a vacuum hose 70 attached to it, the vacuum hose 70 feeding back to a centrally disposed vacuum device, the vacuum device (not shown) being of known common manufacture and providing suction through the nozzle 50, through the suction head 40 and then through the vacuum hose 70. See FIGS. 1 through 4.

As is also shown in FIG. 1, the chip vacuum assembly and apparatus 10 of the present invention includes a rocker arm 80. A first end 82 of the rocker arm 80 is attachable to the proximal 14 portion of the pivoting hex slide 12. The second end 84 of the rocker arm 80 is pivotally attached to one end 92 of a pneumatic cylinder 90. While the cylinder 90 is disclosed in the preferred embodiment to be an air-actuated device, such is not a limitation of the present invention. It is to be understood that other hydraulic or electrical servo-motor devices or other devices capable of linearly-actuated movement, i.e. linear actuator means, could be used as well without deviating from the scope of the present invention. Extending upwardly from the first end 82 of the rocker arm 80 is an extension member 86. The extension member 86 is intended to engage a limit switch 8, the limit switch 8 reporting to a programmable logic controller that the bracketry 12, 20, 30 is in the "upright" position. In the preferred embodiment, the air cylinder 90 is secured to the side 6 of the sawing machine 1 by means of a mounting post 99, although other mounting means could be used. The air cylinder 90 includes air inlet and outlet ports 94 that actuate a piston (not shown) within the air cylinder 90, the piston moving linearly inwardly and outwardly relative to the air cylinder 90.

Figure 3:
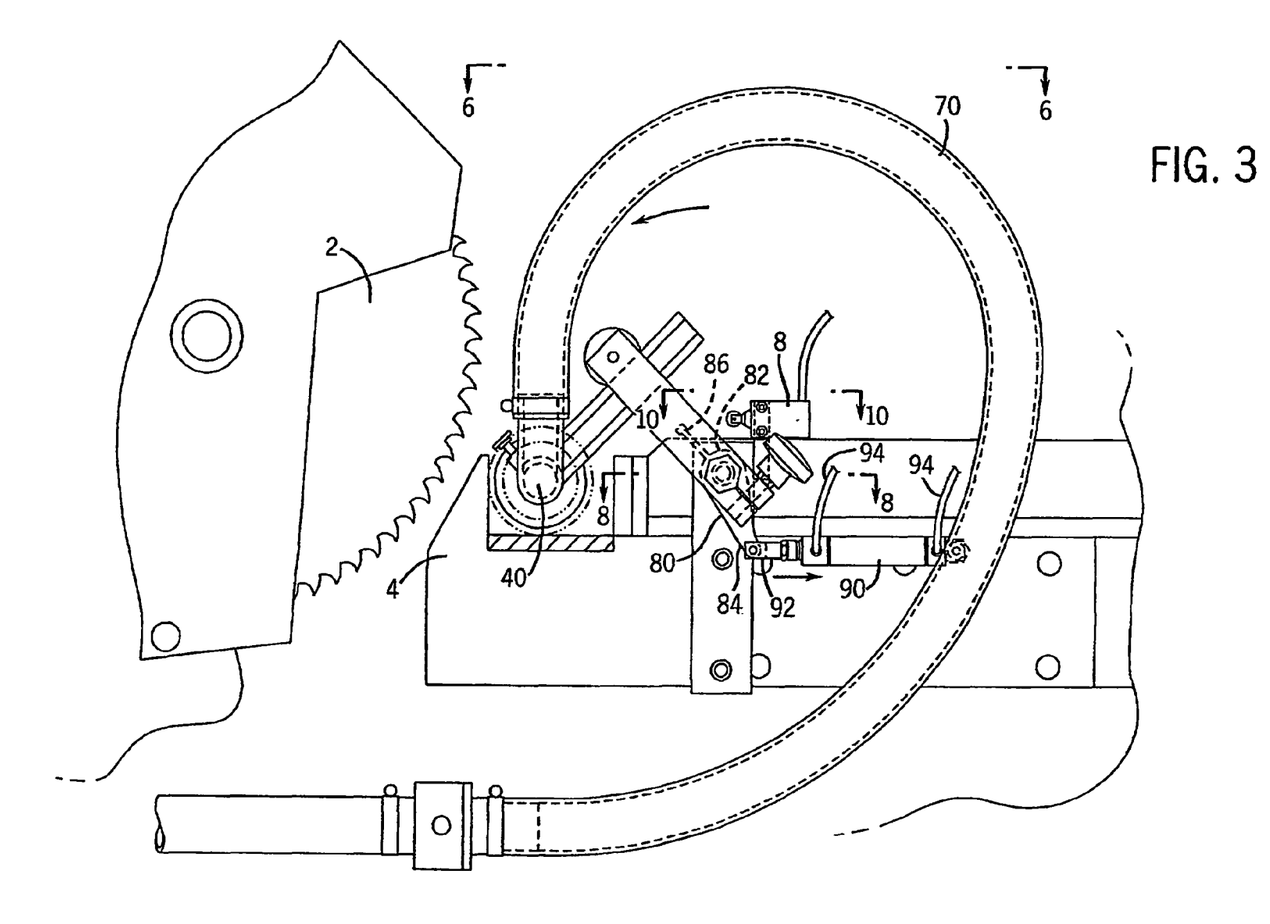
FIG. 3 is a front elevational view of the chip vacuum system and apparatus and showing the nozzle portion in the fully "down" position.
Figure 4:
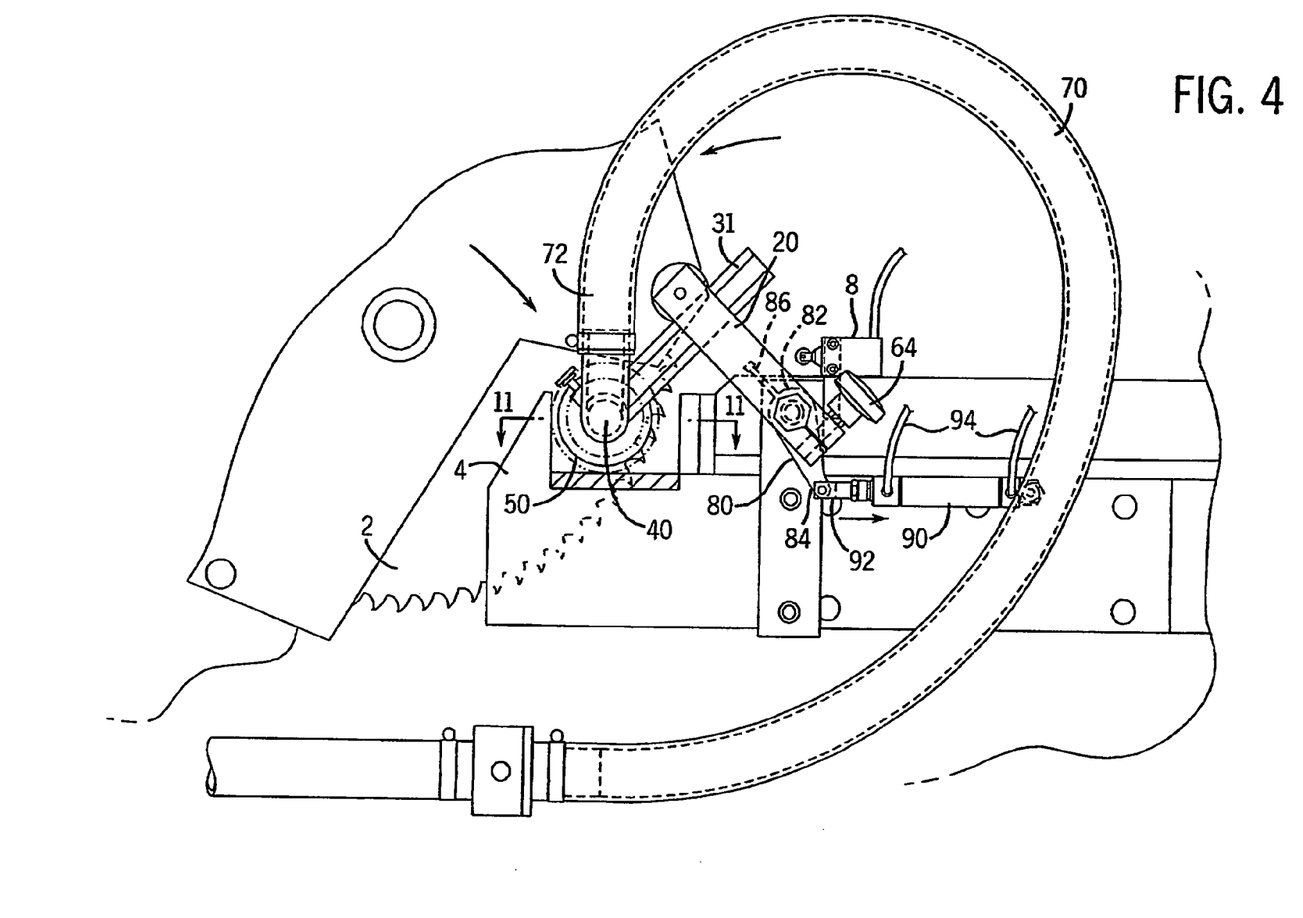
FIG. 4 is a second front elevational view of the chip vacuum system and apparatus showing the nozzle in the "down" position and showing the sawing blade of the sawing machine cutting through a piece of round tubular metal stock.
Figure 7:
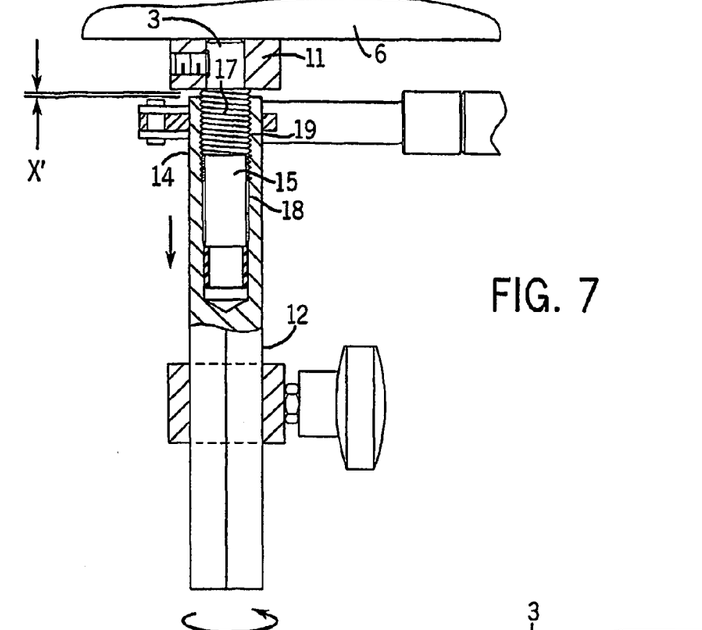
FIG. 7 is an enlarged partial top plan and partially sectioned view of the system and apparatus taken along line 7-7 of FIG. 2.
Figure 8:
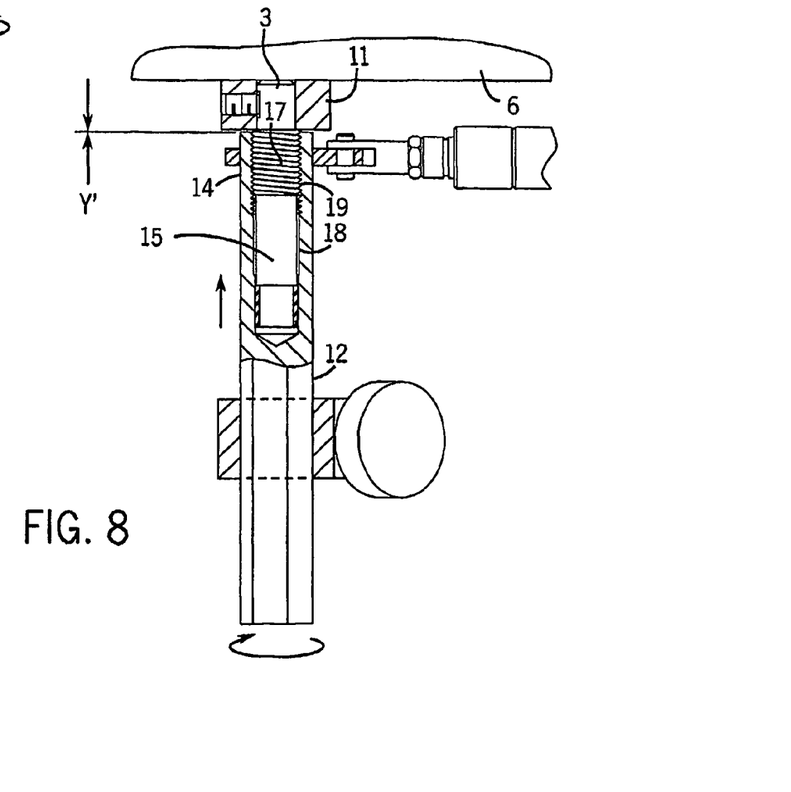
FIG. 8 is an enlarged partial top plan and partially sectioned view of the system and apparatus taken along line 8-8 of FIG. 3.

Reference was made earlier in this detailed description to the keeper 11 that serves as an anchor for the proximal end 14 of the first hex slide 12. Referring now to FIGS. 7 and 8, it will be seen that the keeper 11 is really a fastening base for one end 13 a partially threaded bolt 15. The bolt 15 has an externally threaded portion 17 that meshes with an internally threaded portion 19 of a centered aperture 18 that is defined within the proximal end 14 of the first hex slide 12. In this fashion, rotation of the first hex slide 12 in one direction incrementally moves the first hex slide 12 away from the bolt 15 and keeper 11. See FIG. 7. The distance moved is shown as X'. Rotation of the first hex slide 12 in the opposite direction incrementally moves the first hex slide 12 back towards the bolt 15 and the keeper 11. See FIG. 8. The original position is shown as Y', which corresponds to the position that is desirable for mating the flared end 54 and O-ring 56 of the nozzle 50 to the cut surface 103 of the stock 100. On the other hand, the displacement X' represents the position that is desirable for backing the nozzle 50 away from the face 103 of the stock 100 to allow for suitable clearance from the cut part during normal cycling. These two positions are represented by FIGS. 3 and 4 and by FIG. 2, respectively.

It should also be mentioned that the chip vacuum system and apparatus 10 of present invention utilizes particular electrical signals that may be created and used by a programmable logic controller, or PLC (not shown) as previously mentioned, or by other suitable electronic control circuitry, that is part of the controls for the saw 1, i.e. the sawing machine's PLC, it being understood that the sawing machine 1 uses electronic controls to move the stock 100, to clamp the stock 100 and to move the saw blade 2. Some of these signals are intercepted by an additional controller (also not shown), the additional controller being specifically provided to control the functionality of the vacuum system and assembly 10, i.e. the vacuum system's PLC or electronic control means. That is, a PLC or other suitable control circuitry could be used to control the functionality of the vacuum system and assembly 10 of the present invention. Either would be acceptable and together are referred to here as the "vacuum system controller." Some of these signals are created or intercepted by the vacuum system controller and include the following:

A. Auto/Manual Switch—This is a switch to place the sawing machine 1 into a manual or automatic mode of operation. It is used in conjunction with other inputs to determine if it is appropriate to retract or extend the bracketry 12, 20, 30 of the vacuum system 10.

B. Chute—This is an output signal from the sawing machine's controller that allows the vacuum system 10 to know when a "trim cut" is in process. This process will be discussed in further detail during the discussion of the application of the vacuum system controller and apparatus 10.

C. Cycle Start/Stop—These are output signals from the sawing machine's controller to tell the sawing machine 1 to start or stop the sawing cycle. These signals are utilized to determine if the saw cycle is in process. It provides an opportunity to the vacuum system controller to see if it is acceptable to retract or extend the bracketry 12, 20, 30 of the vacuum system 10.

D. Cylinder Output—This is an output signal of the vacuum system controller used to actuate a solenoid to control the inward and outward movement of the air cylinder 90.

E. Emergency Stop—This is an output signal from the saw controller used as an input to the vacuum system controller to indicate an immediate stop condition.

F. Limit Switch—As alluded to earlier, the limit switch 8 is provided so as to report to the vacuum system controller that the bracketry 12, 20, 30 is in the "upright" position.

G. Saw Blade Start—This is an output signal of the sawing machine controller that is intercepted by the vacuum controller to determine the appropriateness of actuating the vacuum system 10.

H. Saw Retract—This is an output signal utilized by the sawing machine controller to retract the saw blade 2 after a cut. This signal is intercepted by the vacuum controller and used to determine an appropriate time to retract the saw blade 2 and the vacuum system 10.

I. Vacuum On/Off Switch—This is a switch to turn the vacuum system 10 "on" and "off."

Figure 11:
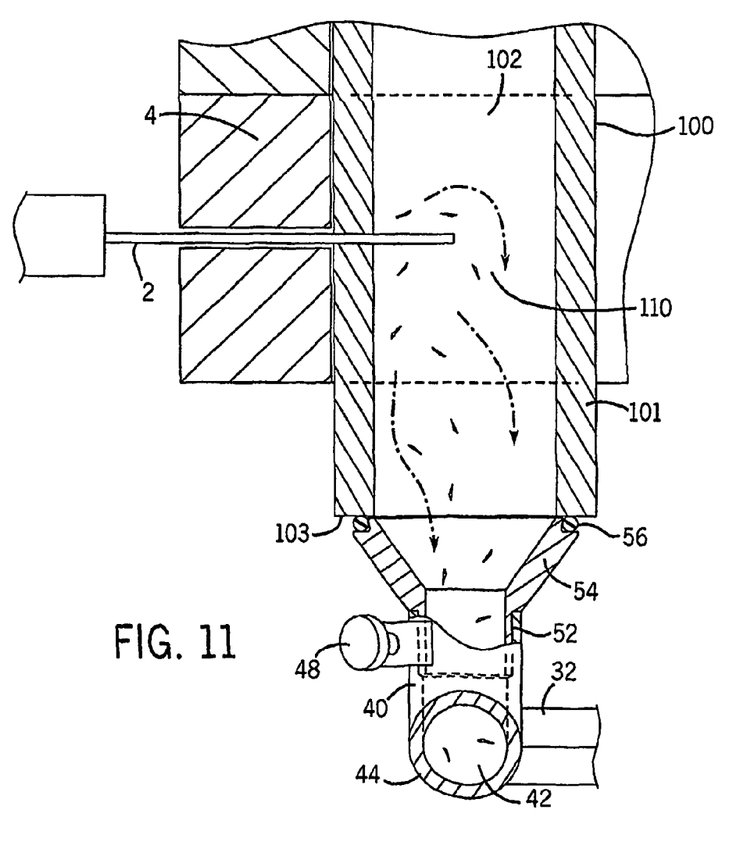
FIG. 11 is a partially sectioned top plan view of the tubular stock and showing the chips being generated by the blade as it cuts through the tubing, the view being taken along line 11-11 of FIG. 4.

In application, an operator would set up the sawing machine 1 for the automatic processing and cutting of the tube-shaped stock 100, for example, of this particular embodiment. The operator would then begin the normal automatic operation of the sawing machine 1. The vacuum system 10 is still switched "off" at this point. Once the "trim cut" or first cut to square up the end of the stock 100 has been completed, which cut creates a cut surface, the sawing machine 1 will automatically index the stock 100 to position the blade 2 for the cut of the first part for the automatically programmed job, whatever that job may be and which could also include a purely manual operation. When the first cut commences, the operator should interrupt the sawing process by pressing the cycle "stop" button and placing the sawing machine 1 into manual mode. Here again, this particular step could also be an automated one, the present invention not being limited in that regard. The operator would then lower the vacuum nozzle 50 into position and make longitudinal adjustments of the double split clamp 20 along the first hex slide 12 for the particular part length to be cut. The sawing machine 1 will then be placed back into automatic mode and the vacuum system 10 switched to the "on" position. For every part thereafter, the vacuum system 10 will actuate and the vacuum nozzle 50 will be moved into place to extract chips 100 from the cutting area as shown in FIGS. 3 and 4. This movement of the nozzle 50 is accomplished by actuation through the PLC (not shown) that controls the air cylinder 90. That is, as a cut is to be made, the air cylinder 90 is actuated to move the piston inwardly. This results in second end 84 of the rocker arm 80 being pulled towards the air cylinder 90, as is shown in FIG. 3, thus rotating the bracketry 12, 20, 30 in a counter-clockwise direction to the point that the nozzle 50 is axially aligned with the stock 100. As this movement occurs, the nozzle 50 is also moved towards the previously cut surface 103 of the stock 100 due to the threaded relationship between the first hex slide 12 and the bolt 15. See also FIGS. 6, 8 and 10. In this position, the vacuum applied to the vacuum hose 70 extracts the metal chips 110 during the cutting process, as is shown in FIG. 11.

Figures 9, 10:
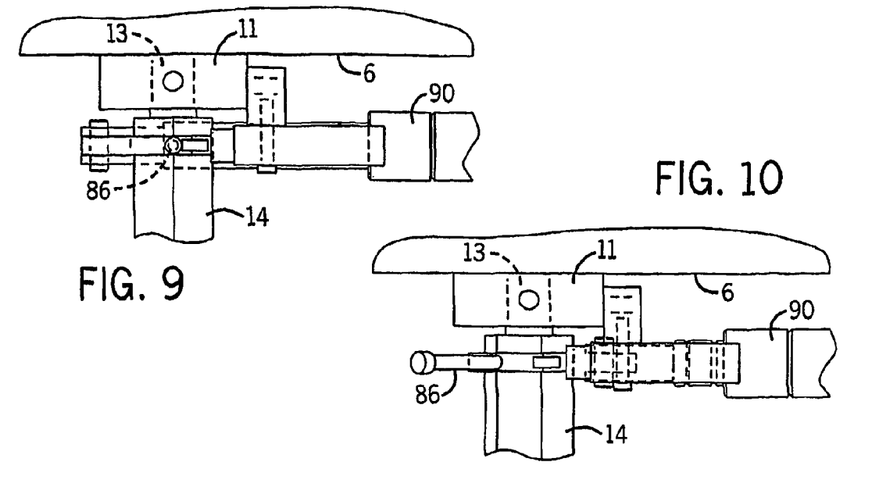
FIG. 9 is a further enlarged top plan view of the system and apparatus taken along 9-9 of FIG. 2.
FIG. 10 is further enlarged top plan view of the system and apparatus taken along 10-10 of FIG. 3.

After each cut, the vacuum nozzle 50 will move into its retracted position as shown in FIGS. 1 and 2, and out of the way, while the stock 100 is indexed and the saw 1 prepares for the next cut. This movement of the nozzle 50 is accomplished by additional actuation of the solenoid or other suitable electronic control that controls the air cylinder 90. That is, after the cut is made and the cut piece is separated from the stock 100 and is ready to be diverted to a collection site by means of a saw discharge 9, as is shown in FIG. 1, the air cylinder 90 is actuated to move the piston linearly outwardly. This results in the second end 84 of the rocker arm 80 being pushed away from the air cylinder 90, as shown in FIG. 2. This rotates the bracketry 12, 20, 30 in a clockwise direction to the point that the nozzle 50 is moved to a retracted position. As shown in FIGS. 5, 7 and 9, this movement moves the nozzle 50 away from the cut surface 103 of the stock 100. This movement minimizes any scuffing of the resilient O-ring 56 against the cut surface 103 of the stock 100, the O-ring 56 allowing a relatively tight vacuum seal during cutting to maximize chip 110 extraction during cutting. The cycle continues until the job is complete or new stock or material is required. If new material is required, the sawing machine 1 may reload it automatically. Upon a reload, the first cut is again a "trim cut" and the vacuum system 10 will not actuate until the first piece is actually cut.

Based on the foregoing, it will be seen that there has been provided a new and useful means for extracting metal chips and cuttings away from the cutting area of a sawing machine without moving them to other undesirable areas of the machine; that accomplishes this extraction by means of a vacuum arrangement; that utilizes a minimal number of elements and a minimal number of steps; and that can be used with sawing machines as original equipment or as a retrofit.

What is claimed is:

1. A chip vacuum system for use with a sawing machine and a vacuum device operable to create suction, the sawing machine comprising a saw blade, a holder operable to clamp a longitudinally-extending piece of hollow stock comprising a cut surface, the holder comprising a saw blade cutting area within which the saw blade is operable to cut the longitudinally-extending stock substantially transversely, the cut surface of the hollow stock having a cross-sectional shape, and a mounting surface, the system comprising:

a vacuum hose having an end, the vacuum hose feeding back to the vacuum device to provide suction through the vacuum hose;

a vacuum suction head attached to the vacuum hose end;

a vacuum nozzle attached to the vacuum suction head; the vacuum hose, the vacuum suction head and the vacuum nozzle comprising a combined structure without direct contact with the saw blade, the combined structure being separately movable relative to the saw blade; the vacuum suction nozzle comprising an end having a shape that substantially matches the cross-sectional shape of the cut surface of the hollow stock, the vacuum suction nozzle further being placed in direct contact with the cut surface of the hollow stock to substantially seal the vacuum suction nozzle with the cut surface of the hollow stock to create a vacuum continuum through the stock, the vacuum nozzle, the vacuum suction head and the vacuum hose to remove chips from within the stock, such chips being created during cutting of the stock; and bracketry for placing the vacuum suction head in direct contact with the cut surface of the hollow stock, the bracketry being attached to the mounting surface of the sawing machine and being movable such that the vacuum suction head is moved alternatively into and out of engagement with the cut surface of the hollow stock, the bracketry further comprising:

a first longitudinally-extending member having a central axis, the first longitudinally-extending member being rotatable about its axis;

a second longitudinally-extending member;

a third longitudinally-extending member; and a nozzle-receiving member;

the nozzle-receiving member being attachable to the third longitudinally-extending member; and wherein the second longitudinally-extending member is slideably attachable to each of the first and third longitudinally-extending members;

wherein the first longitudinally-extending member comprises an internally threaded distal portion and the chip vacuum system further comprises an externally threaded bolt and keeper attached to the mounting surface of the sawing machine, the threaded portions thereof being complementary such that rotational movement of the first longitudinally-extending member about its axis further incrementally moves the first member along its axis and moves the nozzle incrementally outward and away from the cut surface of the hollow stock; and wherein chips created by the saw blade during cutting of the hollow stock are extracted from within the hollow stock.

2. The chip vacuum system of claim 1 wherein bracketry movement is controlled by an electronic controller.

3. The chip vacuum system of claim 2 wherein the controller actuates bracketry movement by means of one from a group consisting of pneumatic drive means, hydraulic drive means, electric servo-motor drive means, or a linear actuator means.

4. A sawing machine, comprising:

a saw blade;

a holder operable to clamp a longitudinally-extending piece of hollow stock comprising a cut surface, the holder comprising a saw blade cutting area within which the saw blade is operable to cut the longitudinally-extending stock substantially transversely to the saw blade, the cut surface of the hollow stock having a cross-sectional shape;

a mounting surface;

a vacuum device operable to provide suction;

a vacuum hose having an end, the vacuum hose feeding back to the vacuum device to provide suction through the vacuum hose;

a chip vacuum apparatus comprising:

a bolt and keeper attached to the mounting surface of the sawing machine, the bolt comprising an externally threaded portion;

a first longitudinally-extending member having a proximal end and a end and a central axis, the proximal end of the first longitudinally-extending member comprising a centered aperture having an internally threaded portion, the internally threaded portion of the aperture meshing with the externally threaded portion of the bolt, the first member being rotatable about its central axis;

a second longitudinally-extending member having a first end that is slidably attached to the distal end of the first longitudinally-extending member and a second end;

a third longitudinally-extending member having a first end that is slidably attached to the second end of the second longitudinally-extending member and a second end;

a vacuum suction head attached to the vacuum hose end;

a vacuum nozzle, the vacuum nozzle being attached to the second end of the third longitudinally-extending member and to the vacuum suction head, the vacuum hose; the vacuum suction head and the vacuum nozzle comprising a combined structure without direct contact with the saw blade and the combined structure being separately movable relative to the saw blade; the vacuum suction nozzle further comprising an end having a shape that substantially matches the cross-sectional shape of the cut surface of the hollow stock, the vacuum suction nozzle further being placed in direct contact with the cut surface of the hollow stock to substantially seal the vacuum suction nozzle with the cut surface of the hollow stock to create a vacuum continuum through the stock, the vacuum nozzle, the vacuum suction head and the vacuum hose to remove chips from within the stock, such chips being created during cutting of the stock by the saw blade; and an actuator comprising a first end connected to the mounting surface of the sawing machine and a second end connected to the proximal end of the first longitudinally-extending member, the actuator being operable to rotate the first longitudinally-extending about its axis and thereby pivot the nozzle to a first position wherein it is engaged with the hollow stock to be cut and to a second position away from the hollow stock to be cut.

5. The sawing machine of claim 4 further comprising means for actuating the actuator and wherein the means for actuating the actuator comprises an electronic controller and one from a group consisting of pneumatic drive means, hydraulic drive means, electric servo-motor drive means or linear actuator means.

6. The sawing machine of claim 5 wherein the vacuum suction nozzle further comprising a resilient O-ring attached to the vacuum nozzle end, the vacuum suction nozzle and O-ring further being placed in direct contact with the cut surface of the hollow stock to substantially seal the vacuum suction nozzle and O-ring with the cut surface of the hollow stock.

7. The chip vacuum system of claim 1 wherein the vacuum suction nozzle further comprising a resilient O-ring attached to the vacuum nozzle end, the vacuum suction nozzle and O-ring further being placed in direct contact with the cut surface of the hollow stock to substantially seal the vacuum suction nozzle and O-ring with the cut surface of the hollow stock.

* * * * *